(12) United States Patent
Ball (10) Patent No.: US 10,914,064 B1
(45) Date of Patent: Feb. 9, 2021

(54) ARTICLE TO SUPPRESS DRYWALL CRACKING AT INTERIOR CORNERS

(71) Applicant: Jimmy L. Ball, Wilmington, DE (US)

(72) Inventor: Jimmy L. Ball, Wilmington, DE (US)

( * ) Notice: Subject to any disclaimer, the term of this patent is extended or adjusted under 35 U.S.C. 154(b) by 0 days.

(21) Appl. No.: 16/182,584

(22) Filed: Nov. 6, 2018

Related U.S. Application Data (60) Provisional application No. 62/582,164, filed on Nov. 6, 2017.

(51) Int. Cl.
| | |
|---|---|
| *E04B 1/92* | (2006.01) |
| *E04B 2/56* | (2006.01) |
| *B65D 88/12* | (2006.01) |
| *B60P 3/36* | (2006.01) |
| *E06B 1/02* | (2006.01) |

(52) U.S. Cl.
CPC ............... *E04B 1/92* (2013.01); *E04B 2/56* (2013.01); *B60P 3/36* (2013.01); *B65D 88/12* (2013.01); *E06B 1/02* (2013.01)

(58) Field of Classification Search
CPC ........ E06B 1/60; E06B 1/6007; E06B 1/6015; E06B 1/6038; E06B 1/02; E04B 1/92; E04B 2/56; E04B 1/2608; E04B 2001/264; E04B 2001/2415
See application file for complete search history.

(56) References Cited

U.S. PATENT DOCUMENTS

| | | | | |
|---|---|---|---|---|
| 4,455,805 A | * | 6/1984 | Rionda | E04B 1/2612 403/232.1 |
| 4,551,957 A | * | 11/1985 | Madray | E04B 1/24 403/170 |
| 4,572,695 A | * | 2/1986 | Gilb | E04B 1/2608 248/300 |
| 4,688,358 A | * | 8/1987 | Madray | E04B 1/24 403/171 |
| 4,697,393 A | * | 10/1987 | Madray | E04B 1/24 403/171 |
| 5,186,571 A | * | 2/1993 | Hentzschel | E04B 1/2608 256/65.06 |

(Continued)

FOREIGN PATENT DOCUMENTS

DE   202016104559 U1 * 8/2016 ............... E06B 1/60

*Primary Examiner* — Adriana Figueroa
(74) *Attorney, Agent, or Firm* — Ramberg IP, LLC (57) ABSTRACT

An article to suppress cracking of drywall at interior corners features a thin metal brace that includes a piece of sheet metal between 3 and 30 gauge thickness. If the device as-produced or as-received starts out as a flat sheet of metal, the base or flange of the device is then bent at about a 90 degree angle with respect to the rest of the device—the tongue. When the base or flange is then placed flat along the side of a stud or framing, the tongue of the device will then lie flat or flush along the front side of the stud, but at an angle, for example, 45 degrees, with respect to the longitudinal axis of the stud. In a door or window frame, another stud will intersect the first stud at a right angle. Where the tongue crosses this second stud, the tongue may be fastened to this second stud. In another embodiment, the tongue may be bent or folded over and fastened to the side of the stud. This device can be fastened with screws, nails, or staples, as well as a pressed gang plate system. Thus, the instant device serves to tie the framing members together.

5 Claims, 8 Drawing Sheets

(56) References Cited

U.S. PATENT DOCUMENTS

| | | | | |
|---|---|---|---|---|
| 5,259,685 A | * | 11/1993 | Gilb | E04B 1/26 |
| | | | | 403/170 |
| 5,528,875 A | * | 6/1996 | Ziegler, Jr. | A63B 9/00 |
| | | | | 403/231 |
| 5,564,248 A | * | 10/1996 | Callies | E04B 1/2612 |
| | | | | 403/232.1 |
| 5,603,580 A | * | 2/1997 | Leek | E04B 1/2612 |
| | | | | 403/168 |
| D414,400 S | * | 9/1999 | Williams | D8/354 |
| 6,094,880 A | * | 8/2000 | Thompson | E04B 1/2608 |
| | | | | 403/230 |
| 6,295,781 B1 | * | 10/2001 | Thompson | E04B 1/2608 |
| | | | | 403/232.1 |
| 6,640,516 B1 | * | 11/2003 | Thompson | E04B 1/2608 |
| | | | | 52/712 |
| 7,134,252 B2 | * | 11/2006 | Thompson | E04B 1/26 |
| | | | | 52/712 |
| 7,634,889 B1 | * | 12/2009 | diGirolamo | E04B 1/2403 |
| | | | | 403/232.1 |
| 9,650,780 B2 | * | 5/2017 | Tan | E04B 1/2608 |

\* cited by examiner

ARTICLE TO SUPPRESS DRYWALL CRACKING AT INTERIOR CORNERS

CROSS-REFERENCE TO RELATED APPLICATION(S)

This patent document claims the benefit of U.S. Provisional Patent Application No. 62/582,164, filed on Nov. 6, 2017 in the name of Jimmy L. Ball. The entire contents of this commonly owned patent application are incorporated by reference herein.

STATEMENT OF FEDERALLY SPONSORED RESEARCH

None.

BACKGROUND OF THE INVENTION

1. Field of the Invention

The present invention relates to the construction industry, and more specifically, to the drywall and manufactured housing industry (MHI).

2. Discussion of Related Art

The current problem that exists in the Manufactured Housing Industry (MHI) is the cracking associated with the drywall joints related to weak spots in the framing, around the headers and doors, and over and under windows. The weak spots cause the framing to separate, for example, as the structure settles, or as a load is applied to the structure, e.g., the roof.

The separation of the framing causes the drywall to crack, resulting in very costly repairs, as well as takes away from the quality due to the repairs. The repairs are costing the MHI industry an estimated $100 million annually.

Figure 1:
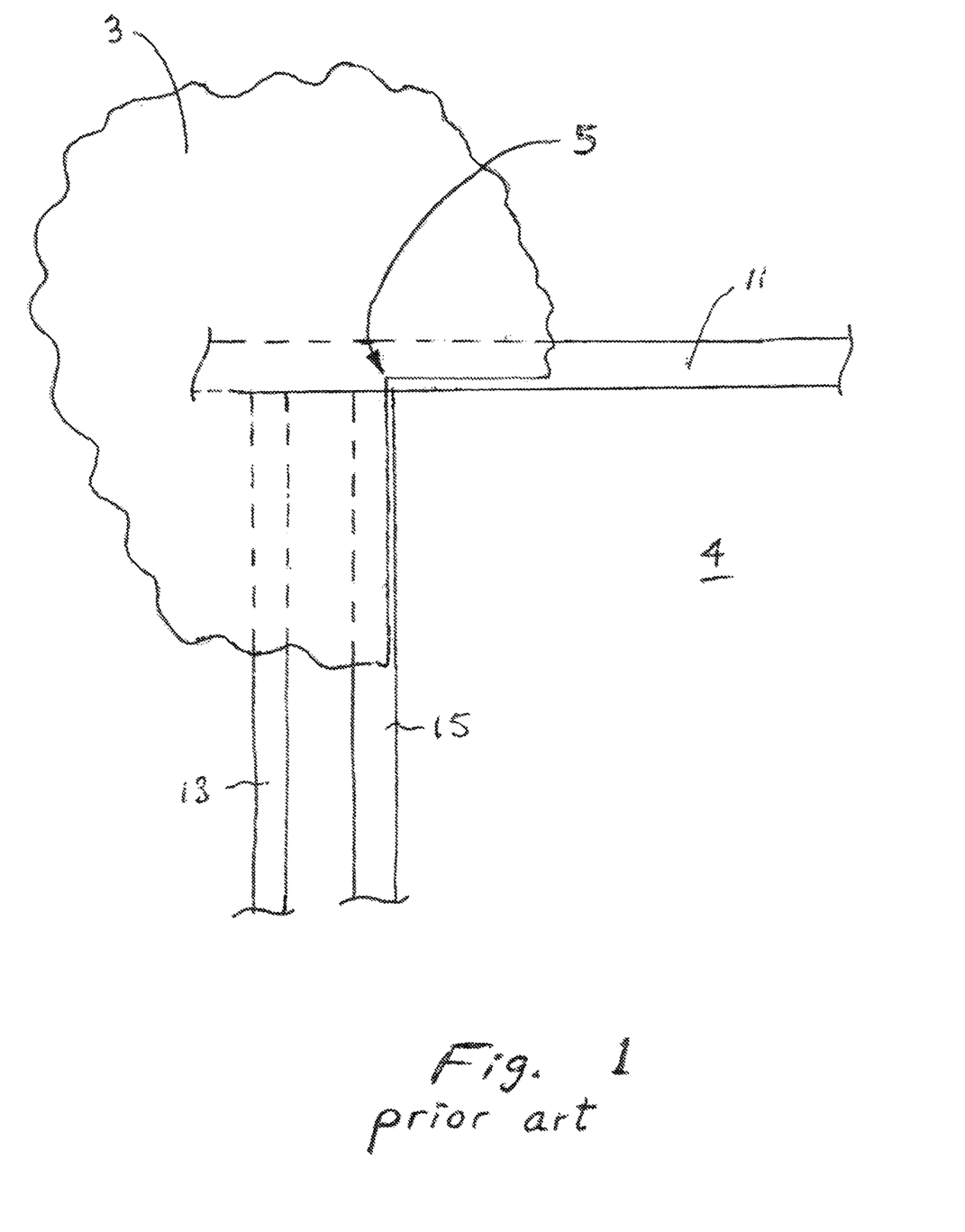
FIG. 1 is a prior art, front orthoscopic view showing drywall fastened to studs framing a window or door, the drywall featuring an interior corner.

The interior corner drywall cracking problem can best be illustrated with reference to FIG. 1. FIG. 1 is a prior art, front orthoscopic view showing drywall 3 fastened to studs 11, 15 framing a window or door 4, the drywall featuring an interior corner 5. Studs 13 and 15 may be nominally two inches by four inches (2 by 4) in cross-section, with stud 15 specifically known as a "trimmer" stud. Stud 11 is referred to as a "header", may be two inches by six inches in cross-section, and may be composed of several studs that collectively add up to two-by-six inches, or possibly more. If the header is made up of multiple studs, it may be referred to as a "header assembly".

The drywall cracking originates at an interior corner of the drywall such as at point 5 illustrated in FIG. 1. Such an interior corner may be formed by joining two pieces of drywall together, such as by taping and sealing two pieces of drywall together. Alternatively, and more typically, this interior corner is formed by cutting a rectangular piece of drywall out of a larger piece, e.g., out of a standard 4 by 8-foot sheet of drywall. The drywall is attached to the framing, for example, with screws or nails. The separation of the framing puts the interior corner in a state of tension (applies tensile force). The interior corner amplifies or magnifies this tension. A crack will begin to form when the local tensile force (as magnified) exceeds the tensile strength of the drywall.

This problem has never been addressed although it has existed forever.

I've not only invented the system that stops this from happening in both areas, doors and windows, this device also adds strength to both areas, which in return saves the MHI tens of millions of dollars annually, in service and poor quality. It also assures the consumer a stronger, safer structure, need it be HUD, or Modular as well as on-site built construction, e.g., traditional home-building. As you will see set forth as follows.

This invention is designed to eliminate the separation of the framing around the headers and doors, allowing NO room for error. The separation of the framing in this area is costing the MHI an estimated $100 million annually.

By adding the device to these areas, it adds structural integrity to the framing in the form of strength, and eliminates the framing separation problem (studs of frame pulling apart).

The prior art of the framing in this area has proven to be a failure. There is no system tying the framing members together in such a way to eliminate this problem.

A gang plate often is used to fasten studs together to form a roof truss. The gang plate is a piece of pressed steel, the pressing forming a plurality of perforations in the steel, and the perforations forming a plurality of sharp steel points that dig in to the wooden stud when the gang plate is attached to the stud. The attachment typically takes place by a clamping device pressing the gang plate against the stud at high pressure.

At the present, there's no other current logical devices or system that's available, or even works. This device is unique in the simplest way. It is amazing in itself that no one ever came up with it!

SUMMARY OF THE INVENTION

What is provided in accordance with the present invention as a basic component is a piece of sheet metal between the gauges of 3 (0.231 inch) to 30 (0.0120 inch) thickness. If the device is flattened to a plane, the device can be described as having a base or flange section, and an elongated section called a "tongue". The longitudinal axis of the tongue is at an angle such as 45 degrees with respect to the longitudinal axis of the flange or base. The flange or base is then folded or bent orthogonal (at a right angle) to the tongue such that the flange or base can then be placed flush against a side of a framing member. The device is then moved along the framing stud until the end of the tongue is even or extends somewhat past another framing member that intersects the first framing member. The flange or base may then be fastened to the side of the first framing member. In one embodiment, the tongue may then be fastened to the face of the second or intersecting framing member. In another embodiment, the portion of the tongue extending past the second framing member may be bent or folded over to form a right angle with respect to a middle portion of the tongue section of the device. The terminal section of the tongue is then flush with the side of the second framing member, and may then be fastened to this side of the second framing member.

This device can be fastened with screws, nails, or staples, as well as using the plurality of sharp point perforations of the pressed gang plate system.

DETAILED DESCRIPTION OF EMBODIMENTS OF THE INVENTION

The current problem that exist in the Manufactured Housing Industry (MHI) is the cracking associated with the drywall joints related to weak spots in the framing, and over and under windows. I've not only invented the system that stops this from happening in both areas, this device also adds strength to both areas, which in return saves the MHI 10s of millions annually, in service and poor quality. It also assures the consumer a stronger, safer structure, need it be HUD, or Modular as well as on-site-built construction. As the reader will see set forth as follows.

A first aspect of this system for the windows and doors consists of a metal device that cuts off the spot of origin where the cracking begins and occurs. By applying this device, it literally gives that area the strength by tying the framing members of the structure together at an oblique angle. The oblique angle design in turn eliminates the point of origin for cracking. By not allowing the framing members to separate from one another, the drywall and especially the interior corners of the drywall are not exposed to tensile forces (that is, not placed in tension). Drywall, particularly an interior corner, cannot support much in the way of tensile load; thus, it cracks. The framing elements often form a "T" shape. Since the metal device of the present invention crosses the point of origin where a crack should develop at an oblique angle, this angular crossing is sometimes referred to as "crossing the T".

The basic component of the inventive device is a piece of sheet metal, such as steel between the gauges of 3 (0.231 inch) to 30 (0.0120 inch) thickness (U.S. Standard for Steel, Eric Oberg, *Machinery Handbook*, 27<sup>th</sup> ed., New York Industrial Press, 2004, p. 2502). The device may be a unitary body, i.e., a single piece of sheet steel, having a flange section, a middle section and a terminal section. The middle and terminal sections are elongated and share a common longitudinal axis, are each about 1 to 2 inches wide and collectively are about 8 to 16 inches long. The middle and terminal sections collectively define the "tongue" portion of the device. The flange section is 1 to 2 inches wide and 4 to 6 inches long as measured along a longitudinal axis. The longitudinal axis of the middle and terminal sections are at an angle relative to the longitudinal axis of the flange section, the angle being between 30 degree and 60 degrees.

If the device as-produced or as-received starts out as a flat sheet of metal, the base or flange of the device is then bent at about a 90 degree angle with respect to the tongue (i.e., middle and terminal sections) of the device. When the base or flange is then placed flat along the side of the stud or framing, the tongue of the device will then lie flat or flush along the front side of the stud, but at an angle, for example, 45 degrees, with respect to the longitudinal axis of the stud. In a door or window frame, another stud will intersect the first stud at a right angle. Where the tongue crosses this second stud, the tongue may be fastened to this second stud. In one embodiment, the tongue is not fastened to the face of this second stud, but instead is bent or folded over and fastened to the side of the stud. If the second stud is a header, then the side may be the top surface of this second stud. In another embodiment, the tongue may be fastened to the face of this second stud, for example, by means of a fastener such as a self-threading screw placed through the overlying drywall, thereby fastening the drywall, the device and the second stud together.

The net effect is to tie the framing members together. The unique design of the way the 45-degree angle covers the point of origin where the cracking starts eliminates that source of that problem.

This device can be fastened with screws, nails, or staples, as well as a pressed gang plate system.

Refer now to the figures, where like numbers refer to and describe like parts. Note that the drawings are not necessarily to scale.

Figure 2:
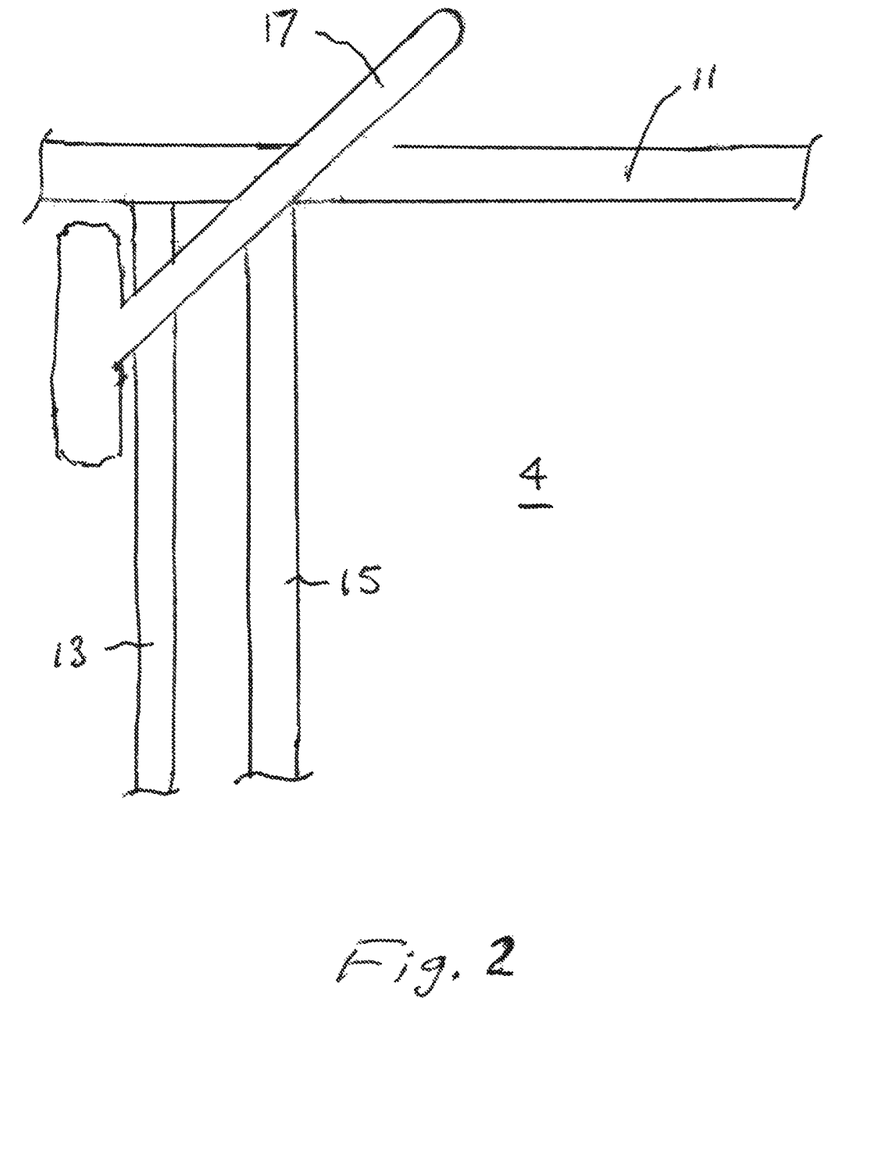
FIG. 2 is a front orthoscopic view showing the placement of the inventive device during construction of a dwelling.
Figure 3:
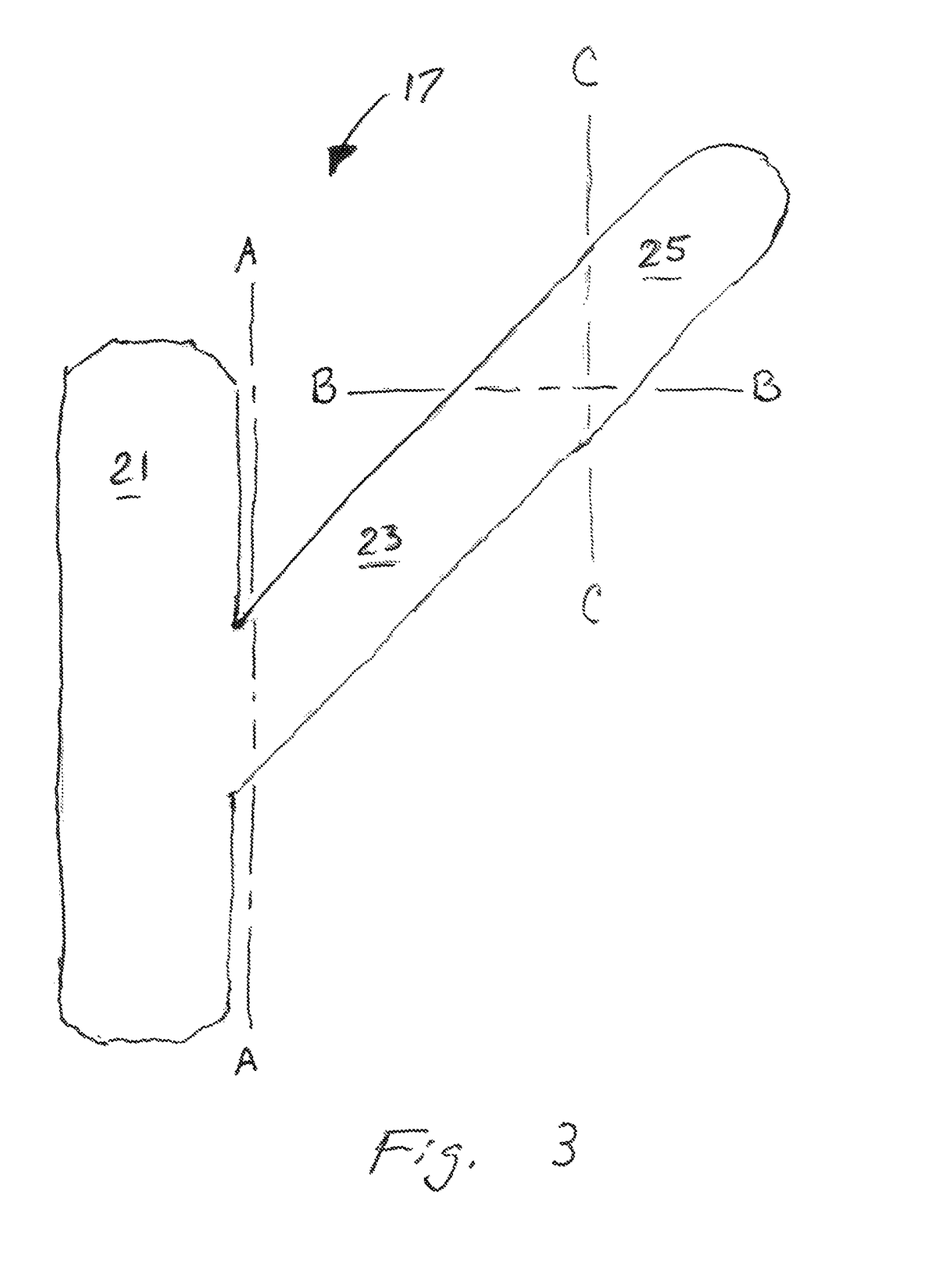
FIG. 3 is a front orthoscopic view of only the device showing the lines along which the ends of the device will be bent.

FIG. 2 is a front orthoscopic view showing the placement of the inventive device during construction of a dwelling. The parts are as follows:
- 4 door or window
- 11 header over door or window
- 13 stud wall
- 15 trimmer
- 17 inventive device FIG. 3 is a front orthoscopic view of only the device showing the lines along which the ends of the device will be bent. The device 17, though unitary, can be thought of as consisting of two parts: a base or flange 21, and a tongue 22, the latter part having an elongated middle region 23, and a head or terminal region 25, for a total of three regions or sections.

Prior to being bent, sections 21, 23, and 25 lie in a common plane. Thus, section 23 here is depicted as extending at about a 45-degree angle with respect to a longitudinal axis (length axis) of section 21. Other angles are possible with section 23 having an angle with respect to section 21 as described above ranging from 30 degrees to 60 degrees, but 45 degrees may be more common, and is very useful.

To use the device of the invention, device 17 is positioned over studs 13 and 15 such that longitudinal axis (which is parallel to line A-A in FIG. 3) of flange 21 is parallel or aligned with stud 13. The device is then moved up or down as necessary so that section 25 extends slightly or somewhat beyond header 11. Flange 21 is then bent at a right angle relative to middle section 23 so that flange 21 lies flush against the side of stud 13. Flange 21 may then be fastened against stud 13. After bending flange 21, terminal section 25 is then bent along line B-B until section 25 is orthogonal with respect to section 23. This should bring section 25 in contact flush with the top surface of header 11. To the extent flange 21 was not yet fastened to stud 13, it may now be fastened, and similarly terminal section 25 is fastened to header 11.

Figure 4:
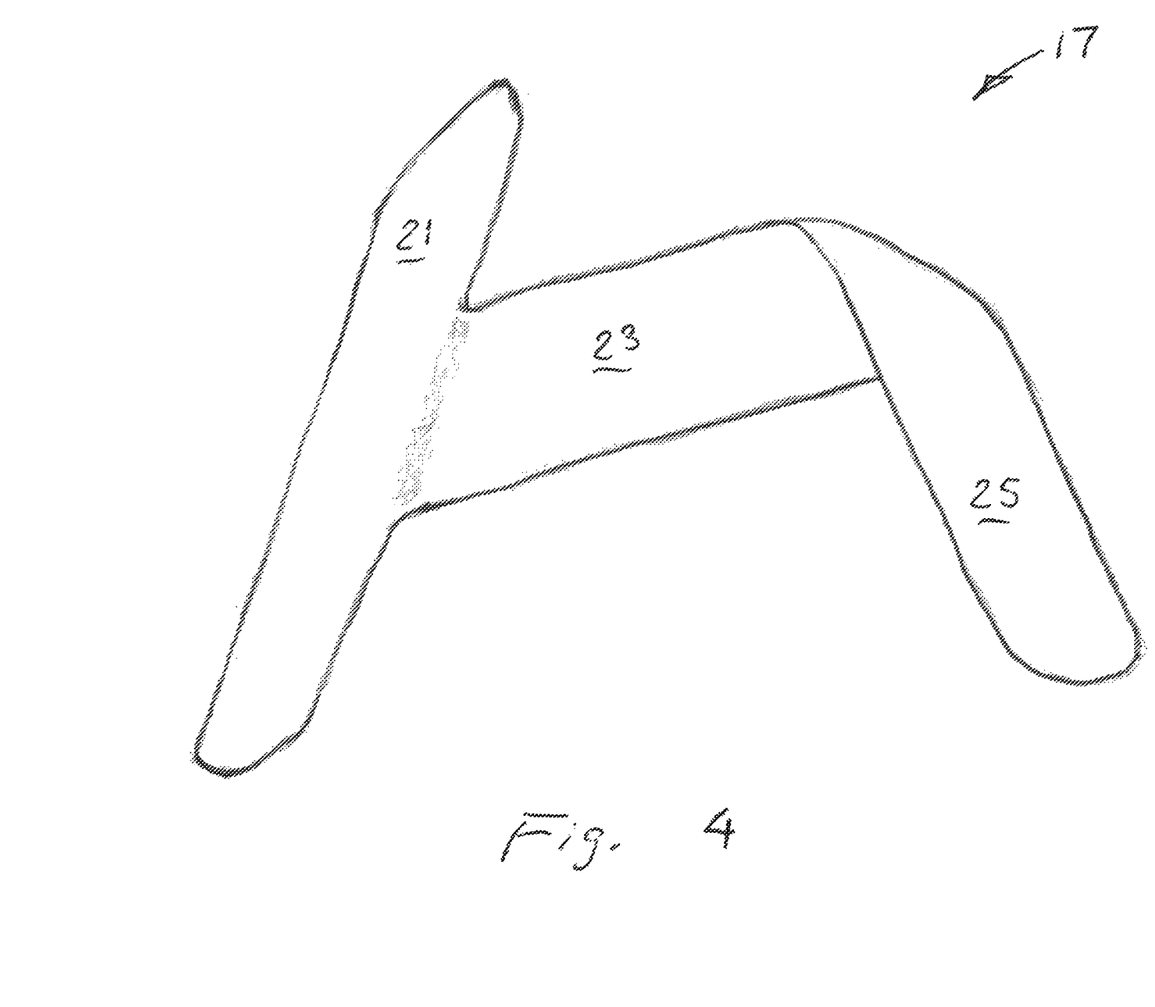
FIGS. 4 and 5 are perspective views of device 17 after is has been bent, with FIG. 4 taken from slightly above the device and with the base and terminal sections being bent toward the viewer, and with FIG. 5 taken from slightly below the device and with the base and terminal sections being bent toward the viewer.
Figure 5:
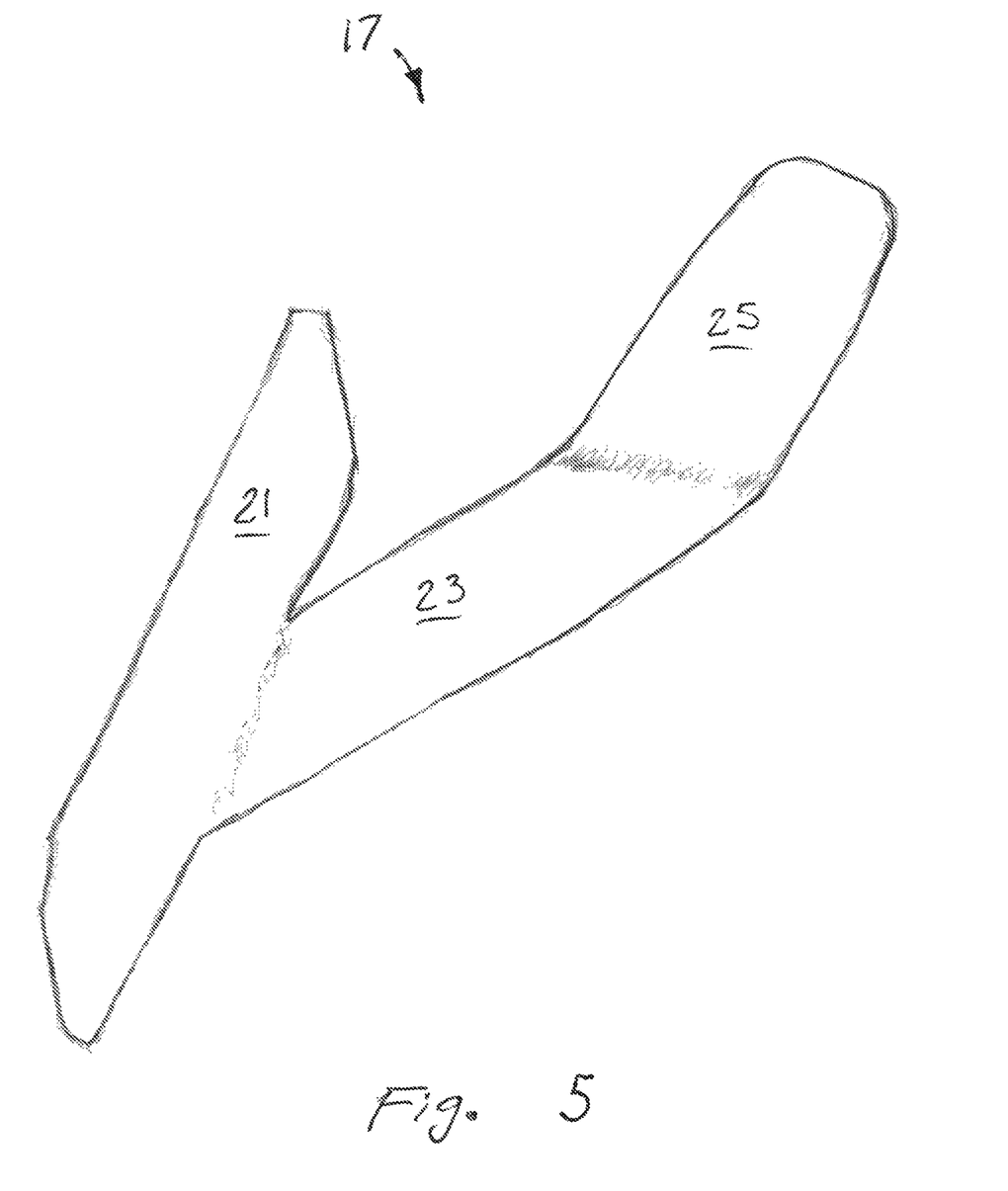

FIGS. 4 and 5 are perspective views of device 17 after is has been bent; that is, after sections 21 and 25 have been bent at right angles relative to middle section 23. Note, however, that the bends go in the opposite direction of the bends suggested in FIG. 2. This would be for a device 17 used on a side opposite the side depicted in FIG. 2. For example, if FIG. 2 depicts the device being used on an interior wall, the FIGS. 4 and 5 views show the bends appropriate for device 17 being used on an exterior wall. Alternatively, if FIG. 2 depicts the device being used on the upper left corner of a door or window frame, the FIGS. 4 and 5 views depict bends appropriate for the device being used on the upper right corner of a door or window frame.

Figure 6:
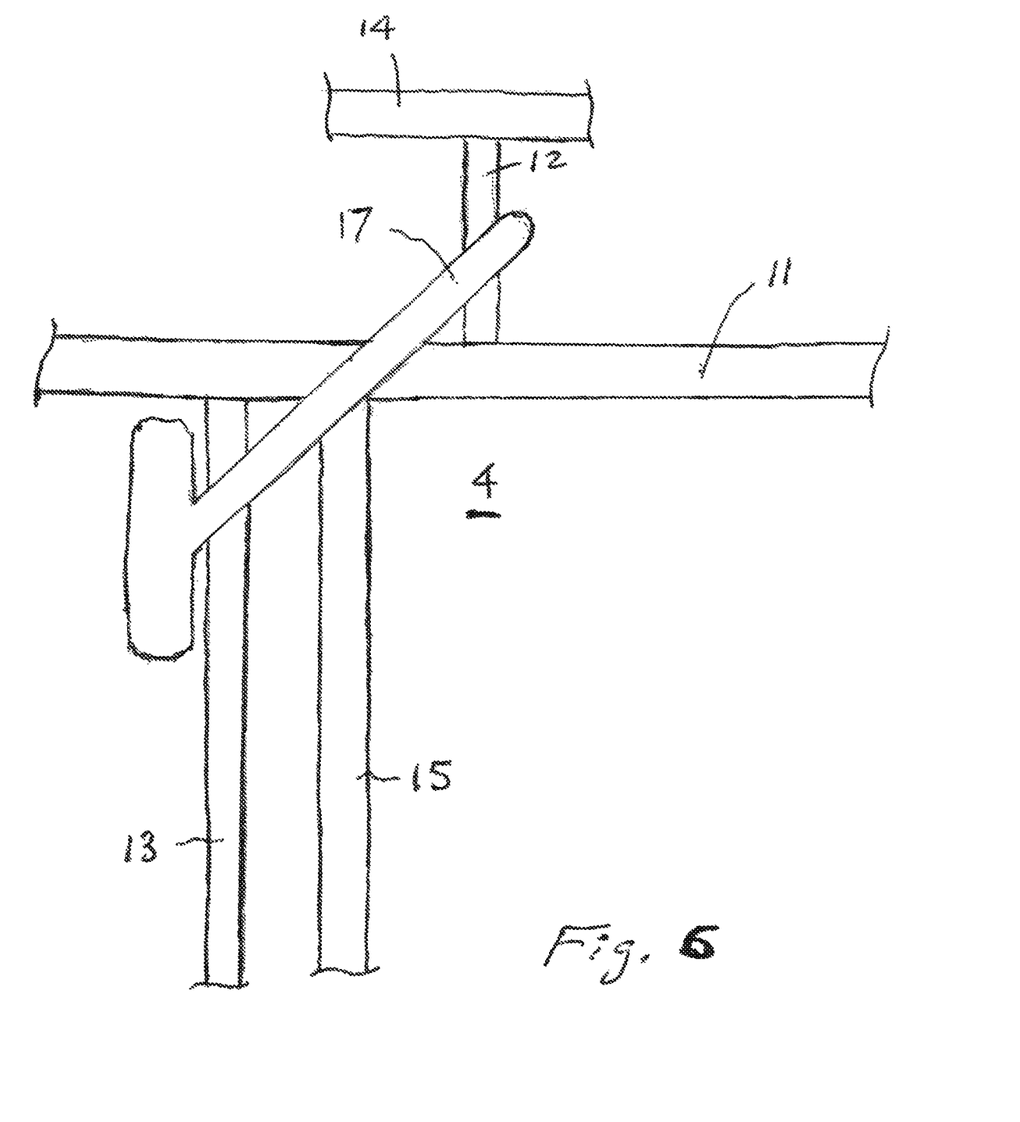
FIG. 6 is a front orthoscopic view showing an alternate placement of the inventive device during construction of a dwelling

FIG. 6 is a front orthoscopic view showing an alternate placement of the inventive device during construction of a dwelling. The parts are as follows:
  4 door or window
  11 header over door or window
  13 stud wall
  15 trimmer
  17 inventive device
  12 cripple stud
  14 upper or top plate This embodiment is the same as the embodiment depicted in FIG. 2, except that this embodiment also features cripple stud 12 and top plate 14. The terminal section 25 of device 17, instead of being bent along lines B-B to lie flush with header 11, is bent along lines C-C so that section 25 comes into contact and lies flush with the side of cripple stud 12. Section 25 then is fastened to cripple stud 12.

Figure 7:
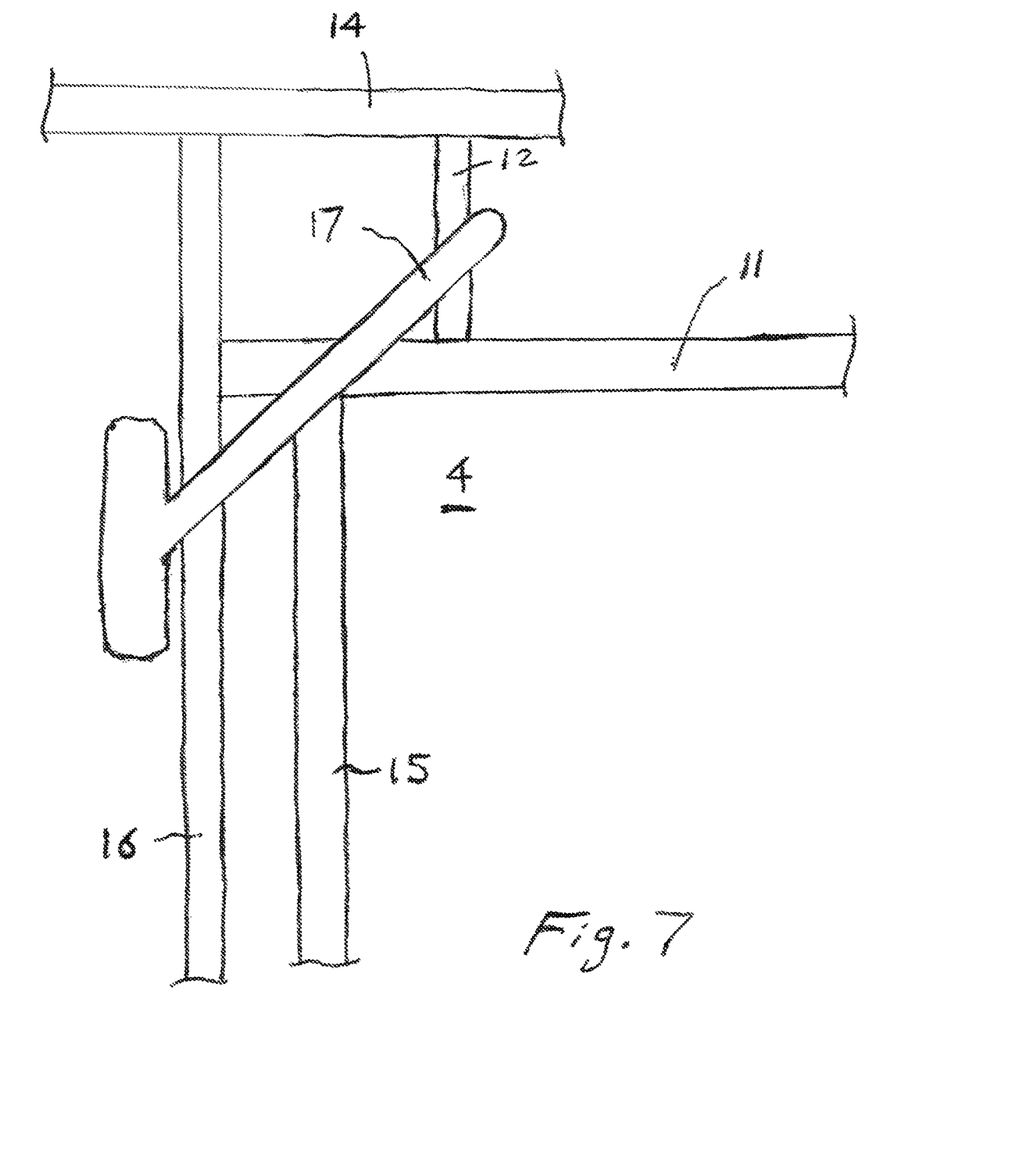
FIG. 7 is similar to the embodiment depicted in FIG. 6 except stud 16 extends all the way up to top or upper plate 14.

FIG. 7 is similar to the embodiment depicted in FIG. 6 except stud 16 extends all the way up to top or upper plate 14. In such a case, stud 16 may be referred to as a "king" stud.

Method of Use

Place the device and fasten it, then staple. More specifically, the device may be fastened to the studs using any fastener known in the art for use in wood or metal studs. Drywall is then installed. Alternatively, once the device has been positioned and fastened to the vertical stud, the drywall may then be positioned, and the drywall fastener (e.g., nail, screw, staple) may then be used to simultaneously fasten the drywall and the device to the intersecting stud in a single operation.

By placing the device on adjoining framing "studs", it is placed where the point of origin (of a crack) is crossed, voiding the point of origin that, in return, eliminates the cracking.

The device is designed for right side application, and one for left side applications as well, for example, by making the bends in the opposite direction.

After device 17 has been positioned and fastened, the drywall is installed. The drywall will contact the device 17 only in the middle section 23. Since the device is thin, the presence of the device underneath the drywall will not noticeably raise the surface or elevation of the drywall relative to adjoining pieces of drywall that may not have devices 17 underneath them. Absence of fasteners in middle section 23 also helps in this regard.

According to the gauge of steel being used in the manufacturing of the device, for an even higher quality, one can also inlay the device by planing the framing before applying the device, and fastening. This eliminates the fasteners from protruding.

The device stops another major underlying problem. Prior art techniques such as planar metal sheets or plates fastened to the face of the adjoining studs directly underneath the drywall have fastener heads that protrude above the plane of the metal sheet or plate. The protrusion of the fasteners behind the drywall panels creates a point of origin for cracking, too. Also, another problem with the fasteners protruding is that it causes even the finish trim to protrude after it breaks through the back side of the drywall, and breaks the core of the drywall. The inventor states, "Not only do I know the effect and the value what this device will do, I also know it should also be mandated into the complete HUD codes to strengthen all exterior walls, to add strength and structural integrity to the housing units."

The flanged feature allows for more area of fastening device without the protrusion of the fastener.

To add even more strength to the structure, this device can be used on both sides of the framing members.

Alternate Aspect of the Invention

Figures 8, 9:
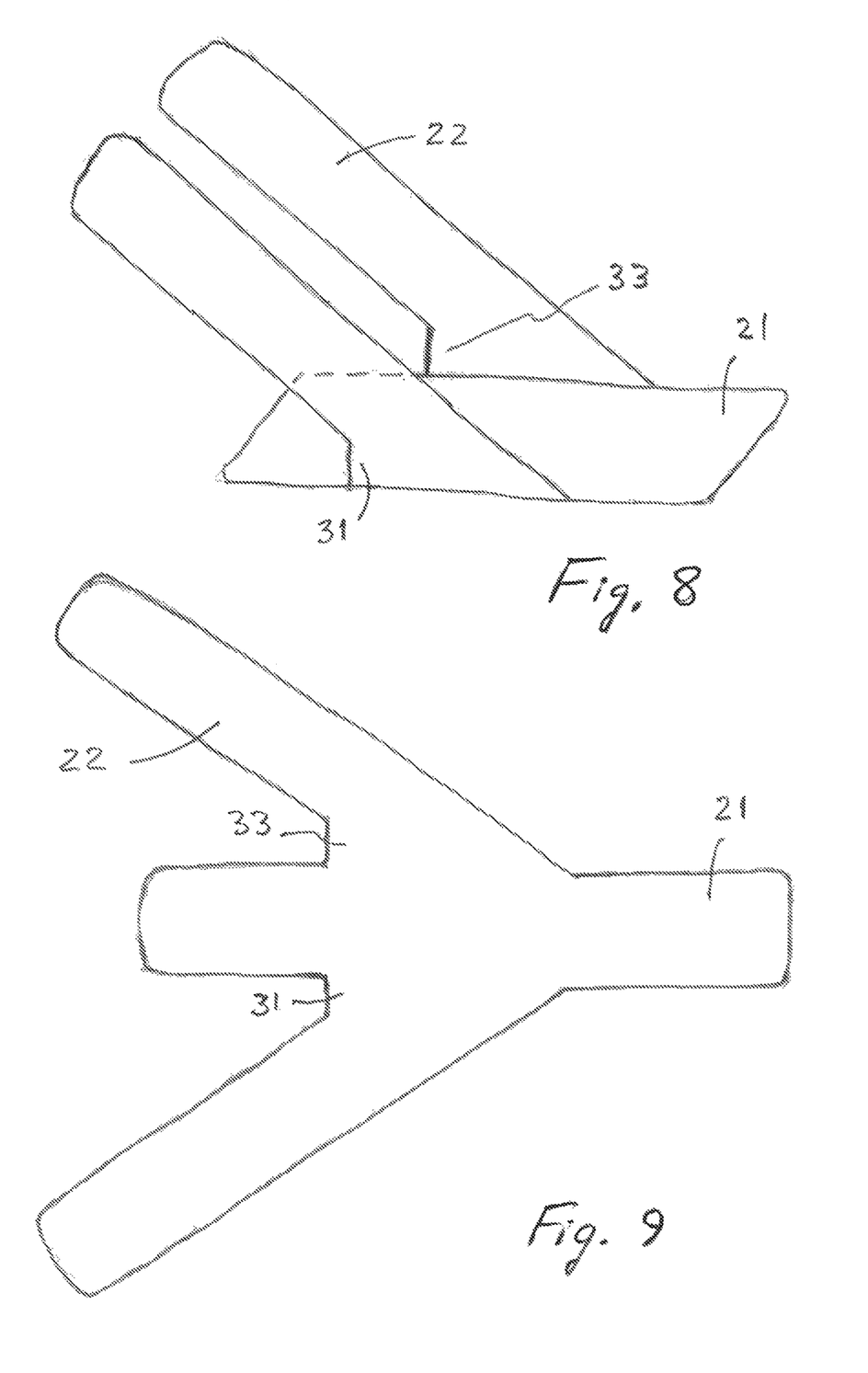
FIG. 8 is an isometric view of a second aspect of the inventive device as-ready to be installed (i.e., the three-dimensional form of the device).
FIG. 9 is a front view of the planar (two-dimensional) or sheet form of the inventive device; i.e., as-fabricated but not yet ready to be installed on a stud.

In a second aspect of the invention, and related to the first aspect described above, a second tongue is added to the device. Refer now to FIG. 8, which is an isometric view of this second aspect of the inventive device as ready to be installed (i.e., the three-dimensional form of the device). Here, the second tongue is parallel to the first tongue and is located or attached to the base portion of the device but on a side of the base opposite the side to which the first tongue is attached. Thus, tongues can be fastened to both inside and outside surfaces of studs, thereby increasing strength of the joining of orthogonal studs.

In this aspect, the width of the base portion preferably matches the width of the stud. For example, for mounting to a 2 by 4 inch wood stud, the base must be 3.5 inches wide, as this is the actual width of a wood stud that is nominally or purportedly 4 inches wide. Note that metal studs (often used in commercial construction) have a different width than a wood stud of nominally the same width. For example, a two-by-four metal stud is actually 4 inches in width.

This "second aspect" article can still be fabricated from a single piece of sheet metal. Refer now to FIG. 9, which is the front view of the planar (two-dimensional) or sheet form of the inventive device; i.e., as-fabricated but not yet ready to be installed on a stud. Here, the second tongue extends away from the base at the same angle as the first tongue, resembling the swept-back wings of certain jet aircraft. Thus, there can be mirror symmetry of the device across the longitudinal axis of the base. Note that web regions 31 and 33 eliminate acute angles in the sheet metal where the tongue meets the base, thereby enhancing metal strength.

If the device is initially provided in flat or sheet form, the base or flange is then folded or bent at a right angle (about 90 degrees) with respect to the tongue portion of the device.

This way, the device can ride the side of the framing studs. It stays accurate 100% every time, and allows for the device to be fastened to the side opposed to the face of the framing, securing it even more. More specifically, and for example, it permits the user to position the device along the side of a vertical stud until the terminal portion of the tongue section extends sufficiently beyond a horizontal framing stud such that this terminal portion may then be folded over the horizontal stud, thereby permitting the bent-over portion of the tongue to be fastened to the side of the horizontal stud.

The simplicity of the device can be altered to be used in various different fields of construction. Invented for the cracking and strengthening for MHI, it can also be used throughout other areas of construction. The sizes can be altered to accommodate different size framing. For instance, the present device can be used in the transportation industry to construct walls and ceilings of tractor trailers, containers for cargo ships, motor coaches (buses), campers (trailers), and recreational vehicles (RVs). As stated earlier, it can be used in the conventional home construction industry. It can also be used in commercial construction, such as office buildings. The framing members (studs) are not limited to wood, but rather the device will work in conjunction with metal studs, too. Since self-tapping screws typically are used to attach to these metal studs, the tongue of the device does not have to be perforated; a self-tapping sheet metal screw can readily bore through the sheet metal tongue of the present device.

This device was designed to be used on the interior of the structure; however, it can be used on the exterior framing, too, to insure even more strength is added to the structure.

What the inventor has invented for the MHI can also be used on-site in traditional home construction where it is needed to assure strength and quality.

SUMMARY AND CONCLUSIONS

By placing the device of the preset invention on adjoining framing "studs", it is placed where the point of origin is crossed, voiding the point of origin—that, in return, eliminates the cracking.

The essential component of this system for the windows and doors consists of a metal device that cuts off the spot of origin when the cracking begins. By applying this device to an area it literally gives that area more strength. It does this by tying the framing members of the structure together at an oblique angle design ("crossing the T"), which in turn eliminates the point of origin for cracking. In the absence of tying the framing members together, the framing may tend to separate. Not allowing the framing to separate eliminates the cause of drywall cracking.

Per the inventor, "This problem has never been addressed although it has existed forever."

Inventor: "As the present, there's no other current logical devices or system that's available, or even works. This device is unique in the most simplest way that's it amazing in itself that no one ever came up with it!"

INDUSTRIAL APPLICABILITY

Invented for the cracking and strengthening for MHI, it can also be used throughout other areas of construction.

The simplicity of the device can be altered to be used in various different field of construction. The sizes can be altered to accommodate different size framing. The device could also incorporate a second tongue parallel to the first tongue, and mounted to the flange region opposite the first tongue. The tongues of the device would be wrapped around and fastened to a stud one at a time.

This device was designed to be used on the interior of the structure; however, it can be used on the exterior framing, too, to insure even more strength is added to the structure. If it is important to fasten the device to the interior side of a stud as well as an exterior-facing side, then the double-tongued version of the device would meet this requirement.

The device was invented to reduce the cracking for the MHI; however after thinking it through, it can also be used throughout the entire construction industry as a way to strengthen the header where cracking also occurs. So it not only solves the MHI problem, but can very well be used outside of the MHI.

The unique design allows for the device to be fastened to the side of the framing members, so that the fasteners do not interfere with the drywall. Each tongue can accept multiple fasteners, perhaps even many fasteners, although at some point, "diminishing returns" set in where additional fasteners do not provide additional strength. The way it is creased at 90 degrees to slide down or up the stud for positioning is a reason it makes it universal, too.

Although the present device could be produced in a perforated form, even in the non-perforated, solid sheet metal form, multiple fasteners can be placed through both the flange as well as the tongue sections. Again, self-tapping screws can readily penetrate the sheet metal of the device. The multiple fasteners can add strength to the framing tying process.

With the effect of strengthening of using the device, as a whole for safety reasons it is the inventor's opinion that the device should be mandated by the Department of Housing and Urban Development (HUD) codes of enforcement for construction of the HUD structures within the MHI.

When the device is used on the exterior as well, the structure gains even more strength.

1. The device instantly adds strength to any structure although it was intended for the MHI.
2. The device suppresses the cracking around all doors and headers and base windows/doors.
3. The device was designed to cut off the point of origin of the drywall cracking as well as tie the framing together to eliminate the shifting and separation of the framing.
4. When the shifting and separation occur, it causes cracking in the drywall and leaves the framing in a weaker state. My device does not allow for the separation to happen.
5. The unique design with the flange makes it where it is 100% accurate every time, to where it crosses the point of origin of the cracking, but also ties all the framing together for the strength needed to keep the separation from happening. The flange also adds more strength as well as more room for fastening.
6. The tongue that crosses and ties all the framing together is universal in a way that makes it to where it can be laid flat on solid headers or be bent as to attached to the side of the framing.
7. The thickness of the metal used to make the device can vary; if an inlaid procedure is used, then the thickness can increase.
8. The flange as well as the tongue of the device will also vary according to the framing members sizes, "different dimension" for different size framing wood/light gauge steel framing.

The separation of the framing around windows and doors has been a century old problem up until now.

The fact that this eliminates the problem in the most difficult scenario—MHI—where the units go through the most rigorous circumstances for construction, proves that it can also be used outside of that industry.

An artisan of ordinary skill will appreciate that various modifications may be made to the invention herein described without departing from the scope or spirit of the invention as defined in the appended claims.

What is claimed is:

1. In a building or vehicle, a reinforced framing, comprising:

(a) a stud;
(b) a header that contacts said stud at a right angle; and
(c) a device for reinforcing intersecting studs in construction, comprising:
   (i) a unitary body of sheet metal having a base, a middle section and a terminal section;
   (ii) wherein the middle and terminal sections are elongated and share a common longitudinal axis, are each about 1 to 2 inches wide and collectively are about 8 to 16 inches long;
   (iii) wherein the base section is 1 to 2 inches wide and 4 to 6 inches long as measured along a longitudinal axis;
   (iv) wherein, in a flat condition, the longitudinal axis of the middle and terminal sections are at an angle relative to the longitudinal axis of the base section, the angle being between 30 degree and 60 degrees; and thereafter said base section is bent orthogonal to said middle section along an axis that is parallel to said longitudinal axis of said base section, and said axis of said bend is located at a boundary between said base section and said middle section; and
   (v) further wherein said middle section is attached to a long dimension of said base section;
(d) wherein said device is used to reinforce said stud and said header, in which
   (i) said middle section of said device contacts said stud and said header, and lies in a plane defined by said stud and said header,
   (ii) said base section is bent orthogonal to said middle section along an axis that is parallel to said longitudinal axis of said base section, and said bend is located at a boundary between said base section and said middle section, and
   (iii) said terminal section is bent orthogonal to said middle section along an axis that is orthogonal to said longitudinal axis of said base section, and further wherein said bend defines a boundary between said terminal section and said middle section.

2. The reinforced framing of claim 1, configured for a residential dwelling.

3. The reinforced framing of claim 1, configured for a commercial building.

4. The reinforced framing of claim 1, configured for a vehicle selected from the group consisting of a camper, recreational vehicle and a tractor trailer.

5. The reinforced framing of claim 1, configured for a container for a cargo ship.

\* \* \* \* \*